April 14, 1970   E. L. WALTERS   3,506,422
METHOD AND APPARATUS FOR FORMING FLAT GLASS
ON A FLUID SUPPORT BED
Filed Oct. 23, 1967

INVENTOR.
Emmett L. Walters
BY
Nobbe & Swope
ATTORNEYS

United States Patent Office 3,506,422
Patented Apr. 14, 1970

3,506,422
METHOD AND APPARATUS FOR FORMING FLAT GLASS ON A FLUID SUPPORT BED
Emmett L. Walters, Toledo, Ohio, assignor to Libbey-Owens-Ford Company, Toledo, Ohio, a corporation of Ohio
Continuation-in-part of application Ser. No. 366,313, May 11, 1964. This application Oct. 23, 1967, Ser. No. 681,049
Int. Cl. C03b 18/02, 35/00
U.S. Cl. 65—25                   14 Claims

ABSTRACT OF THE DISCLOSURE

Continuously lifting a ribbon of glass from a supporting molten metal bath on which it is formed onto a gaseous cushion and conveying and conditioning the ribbon on the gaseous cushion out of direct contact with mechanical supporting and conveying means into an annealing lehr so as to avoid damage to its soft undersurface.

---

This application is a continuation-in-part of application Ser. No. 366,313, now abandoned filed May 11, 1964, entitled "Handling Flat Glass."

The present invention relates broadly to handling, protecting and treating sheet material and more particularly to the supporting and conditioning of a continuously moving newly formed ribbon of glass during passage from one environment toward another.

According to a preferred embodiment of the invention, a newly formed ribbon of glass is lifted from a support in the area of its formation and conveyed continuously therefrom on a gaseous cushion without physical contact or damage to its soft undersurface.

In this form, the present invention is particularly valuable in connection with the so-called "float" process of producing flat glass as described in U.S. Patent 3,083,551, granted Apr. 2, 1963. In such a "float" process, glass (either in ribbon form or in the molten state) is delivered at a controlled rate onto a bath of molten metal and advanced along the surface of the bath under thermal and mechanical conditions which assure (1) that a layer of molten glass that is free to flow laterally is established on the metal bath and (2) that from this molten layer there will develop on the surface of the metal bath a buoyant body of molten glass of stable thickness. As this body of stable thickness develops, it is continuously advanced, in ribbon form, along the bath and sufficiently cooled to permit its being taken therefrom.

In one practical application, the invention is employed to remove the "float" glass ribbon from the surface of the bath of molten metal and direct it toward a conventional annealing lehr.

It is therefore an important object of this invention to provide an improved method of and apparatus for removing a ribbon of glass from a molten metal bath by lifting the same as it is drawn away from the bath and directing it into a defined path leading toward and through an annealing lehr without marring or injuring its soft undersurface.

Another object is to support and convey a newly formed glass ribbon on a gaseous cushion for a sufficient length of time to permit its soft undersurface to become conditioned to contact with conventional mechanical conveying means.

Another object is to provide a controlled atmosphere through which a newly formed glass ribbon travels during transition from its forming to its annealing zone, which atmosphere is adapted to both protect and beneficently treat the soft ribbon.

Other objects and advantages of the invention will become more apparent during the course of the following description, when taken in connection with the accompanying drawings.

In the drawings, wherein like numerals are employed to designate like parts throughout the same:

Referring now more particularly to the drawings, there is illustrated therein the discharge end and associated parts of a float glass producing apparatus as described in U.S. Patent 3,083,551 and in which glass is delivered at a controlled rate by conventional means (not shown) onto a bath of molten metal.

Figure 1:
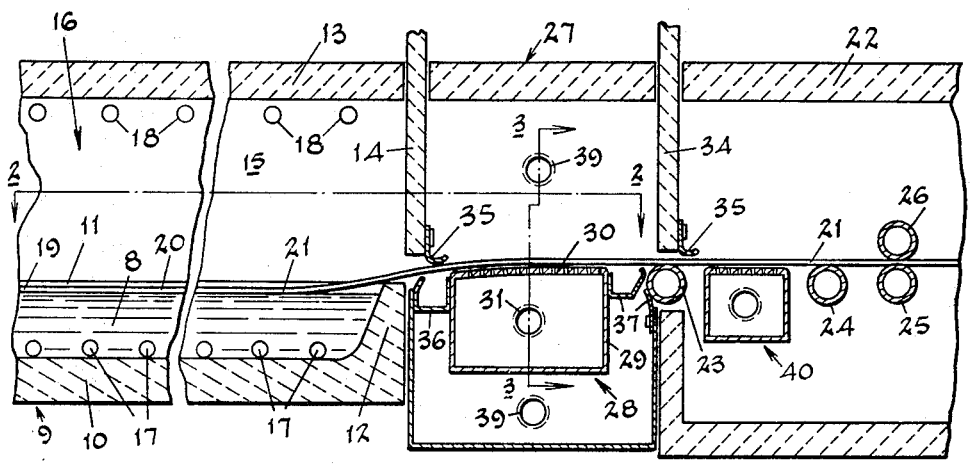
FIG. 1 is a fragmentary, longitudinal, vertical, sectional view through the discharge end of the forming and the entrance end of the annealing zone of one form of continuous machine for producing flat glass by the float process, with a preferred form of the apparatus of this invention located therebetween.

As best shown in FIG. 1, the bath of molten metal 8 is contained in a tank 9, which includes a floor 10, side walls 11 and end walls 12, and supports an overhead structure including a roof 13, vertically adjustable end walls 14 and side walls 15 providing a tunnel over the molten metal bath 8 and defining a headspace 16.

The temperature of the molten metal bath in the tank is regulated from the inlet end to the discharge end by providing thermal regulators, indicated at 17, immersed in the molten metal. The headspace 16 over the bath is preferably heated by radiant heat directed downwardly from heaters 18 mounted in the roof.

In operation, the thermal regulators 17 and 18 at the entry end of the apparatus (not shown) are operated to maintain a temperature of about 1000° C. or slightly higher whereby to transform glass delivered onto the molten metal bath into a buoyant layer of molten glass 19 from which is developed a buoyant body 20 of molten glass of stable thickness.

Thus, the width of the molten metal bath 8 (FIG. 2) is such that the side walls 11 of the tank are at every point spaced from the glass on the bath so that the surface of the molten metal is exposed on each side of the buoyant layer of molten glass 19 and of the body 20 of stable thickness developed from the layer 19. Therefore, the buoyant molten glass in the layer 19 is free to progressively flow laterally across the bath to develop the body 20 of stable thickness, with the body of stable thickness being fully developed when equilibrium has been established between the forces of surface tension of the molten glass and the molten metal, and the forces of gravity. By delivering glass onto the molten bath 8 at a controlled rate substantially equal to the rate of discharge therefrom, the buoyant body of molten glass of stable thickness 20 can be constantly maintained.

Beyond the point where equilibrium is established, the thermal regulators in the roof and tank structures are regulated so that the body of molten glass of stable thickness, in the form of a ribbon 21, is progressively cooled from there to the discharge end. For example, a suitable temperature gradient of descending values is achieved when the temperature of the bath in the forward end of the tank 9 is about 1000° C. and beyond the point where the body of stable thickness develops, descends first to 825° C. and then further to a temperature at which the ribbon 21 is sufficiently stiffened to allow its removal from the molten metal bath, e.g., a temperature (about 650° C.) at which the viscosity is about $10^7$ poises.

Tractive force for advancing the ribbon 21 over the bath 8, removing it therefrom and conveying it to and through an annealing lehr 22 is afforded by conventional mechanical conveying means, here exemplified by supporting rollers 23 to 25 and superimposed roller 26 located in or at the entrance to the lehr. The roll 23 may be considered the first flattening roll and any or all of these rollers may be driven and cooperate with each other and/or subsequent lehr rolls to apply the necessary tractive effort to the glass ribbon.

However, conventional mechanical supporting, flattening, conveying and drawing means of this character present serious problems when they are also used to "lift" the glass ribbon from the molten metal bath.

This is because "float" glass, produced as above described, is of uniform thickness and substantially free of surface distortions, even though it has been neither ground nor polished. In addition it has a natural luster similar to that known as "fire finish." Moreover the float glass is at the peak of its quality when it is ready to leave the molten metal bath but, at this time, is at a temperature around, if not appreciably above 540° C. Consequently its surfaces, and particularly its undersurface, are relatively soft and therefore especially susceptible to marring of the finish and/or the creation of surface defects by physical contact.

For this reason it is important that the means for lifting and removing the glass ribbon 29 from the molten bath be such as will not injure the surface in any way. At the same time it is equally important that the ribbon be smoothly and continuously taken from the molten metal bath and properly directed toward the lehr 22.

The present invention makes all of these things possible by the provision of a transition zone 27 between the molten metal bath 8 and the annealing lehr 22 of a conventional float glass machines and which transition zone contains a device for lifting the ribbon from the surface of the molten metal, conveying it forwardly and directing it into the annealing lehr while supporting it on a cushion of air or other gaseous medium.

By way of illustration, a preferred form of the "lifting" apparatus of the invention, designated 28 in the drawings, comprises a generally rectangular, box-like structure 29 having a curved, pervious upper wall or cover 30. The box 29 is mounted with its upper surface in substantial alignment with the upper surfaces of the rolls 23 to 25 and with the curvature of its upper surface substantially conforming to the curved path in which it is desired to have the ribbon 21 lifted from the surface of the molten metal 8 and carried forward toward the lehr.

Figure 2:
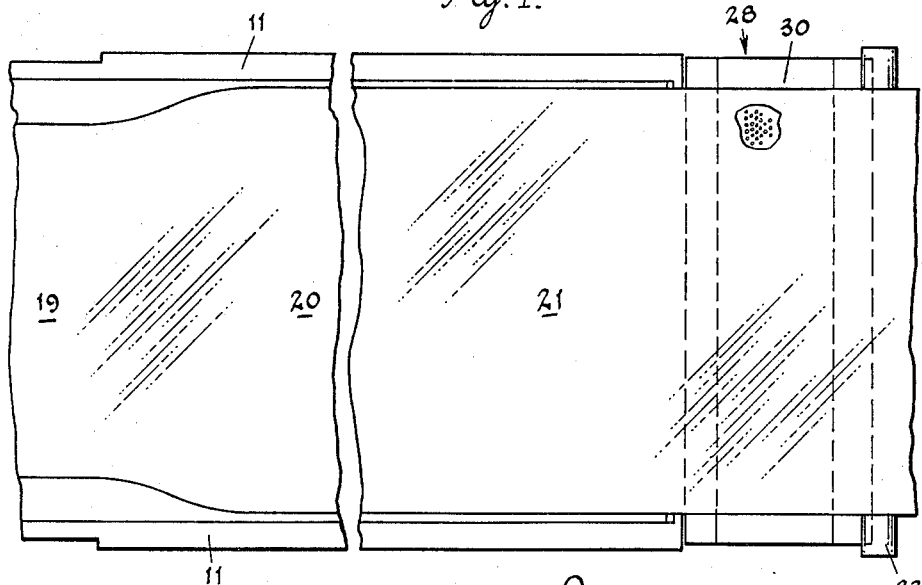
FIG. 2 is a plan view of a part of the structure shown in FIG. 1 taken substantially along the line 2—2.

As best shown in FIG. 2, the ends of the air flotation box 29 extend somewhat beyond the edges of the ribbon 21 but the openings in the upper surface of the box, which may be perforations of any desired size or shape or the result of the wall 30 being made of a porous material, are usually, but not necessarily confined within the transverse area of the glass ribbon. The box 29 is provided with a fluid inlet 31 at one or both ends thereof designed, by means of valves 32 and feed lines 33, to introduce a gaseous medium including air or other gas at predetermined temperatures and under controlled pressures to the interior of the box. As this gas emerges from the openings in the upper wall 30, it will provide a cushion upon which a ribbon of glass passing thereover will ride without physical contact with the box 29 at any point. By maintaining the gas emerging from the pervious upper wall of the box at a uniformed and accurately controlled pressure, a thin protective layer of gas will be continuously maintained between the ribbon and the box and there will be no fluctuation or weaving of the ribbon as it passes thereover.

The temperature of the gas supplied to the box may be so regulated that, while it contributes to the further cooling and setting up of the undersurface of the ribbon, it will not unduly chill the ribbon. On the other hand, where it is desirable to do so, the cushioning gas may be employed at a temperature that will chill the surface of a heated sheet to a point sufficient to temper the same.

Figure 3:
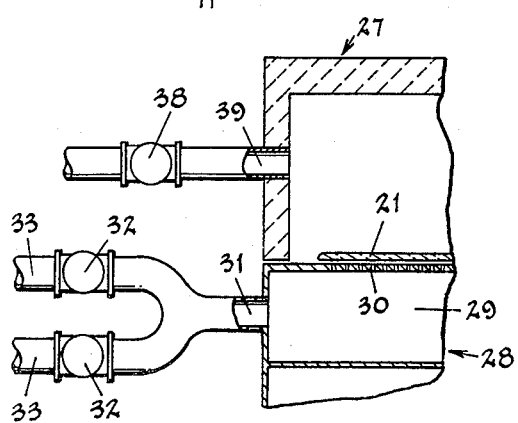
FIG. 3 is a fragmentary, vertical, sectional view taken substantially along the line 3—3 in FIG. 1.

In any event, because a specifically different type of atmosphere will generally be required in the transition zone or area surrounding the box 29 than in the headspace 16 above the molten metal bath or in the lehr 22, it is desirable to isolate the atmosphere within the transition zone 27 from the atmosphere in the forming and the annealing ends of the float apparatus. This may be accomplished by conventional movable end or curtain walls 14 and 34 supplemented by flexible sealing strips 35. As an additional precaution, suction exhaust tubes as shown at 36 and 37 may be provided to bypass any gases that may infiltrate into the transition zone from the forming area of the machine particularly along the undersurface of the moving ribbon. And, finally, valves 38 (FIG. 3) may be provided in the exhaust lines 39 from the transition zone 27 to control the pressure of the atmosphere therein and so the movement of air and gases into and out of this zone.

The gas supplied to the box 29 is preferably a non-oxidizing or a deoxidizing gas such as, for example, hydrogen, nitrogen, argon, carbon monoxide or helium, and may also be or include a gas that will react chemically on any metal residue remaining as a film on the undersurface of the glass from the molten metal in the bath 8, to treat or remove this residue before the ribbon contacts the mechanical conveying and supporting means beyond the transition zone.

Thus, in conventional float glass operations wherein the metal in the bath is molten tin, a residue of stannous oxide may be left on the surface and may even migrate slightly into the glass under certain operating conditions. It has been found that the surface can be treated to remove or neutralize this residue so that it will not adversely affect the glass upon subsequent reheating for fabricating purposes. Contacting the glass at elevated temperatures with chlorine gas or a chlorine compound in vapor form such as hydrogen chloride or zinc chloride has been found to provide such treatment. Likewise, a hydrogen-nitrogen mixture in the proportion of about five percent hydrogen and ninety-five percent nitrogen has been found to beneficially treat the surface. Sulfur trioxide ($SO_3$) gas is particularly well adapted to this treatment, and may be employed separately or combined with an inert gas or ordinary air in forming the gaseous cushion.

As already indicated, the roll 23 acts as a flattening as well as a suporting roll, as may the roll 24, and the time and temperature cycle in the transition zone 27 can be so regulated that by the time the glass ribbon reaches and comes into physical contact with these rolls its undersurface will be conditioned to a point where such contact will not adversely affect the surface finish.

However, in some instances it may be desirable to minimize the weight of the glass ribbon while in contact with the first of the flattening and/or lehr rolls and, to this end, an additional flotation means 40 may be interposed between such rolls. Like the lifting device 28, the flotation means 40 may be in the form of a generally rectangular box with a pervious upper wall or cover and positioned to provide a gaseous cushion under the glass ribbon passing thereover which cushion will exert a lifting effect on the undersurface of the ribbon.

In fact it is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:

1. In a method of producing flat glass in which a layer of molten glass that is free to flow laterally on a bath of molten metal develops into a buoyant body of molten glass of stable thickness, and a tractive force is exerted on said body to move the same as a ribbon of glass along a first path over said metal bath and subsequently along a second path leading into and through an annealing zone; the improvement which comprises the steps of deflecting said ribbon directly from said first path out of contact with mechanical conveying means while supporting said ribbon on a gaseous cushion to lift the ribbon from said bath and direct it into said second path.

2. A method as defined in claim 1 in which said ribbon is deflected through an arcuate path.

3. A method as defined in claim 1 in which said bath of molten metal includes tin and said gaseous cushion comprises a layer of a gas capable of reacting chemically with metal from said molten bath.

4. A method as defined in claim 3 in which said gaseous cushion includes a vapor chosen from the group consisting or chlorine, hydrogen chloride and zinc chloride.

5. A method as defined in claim 3 in which said gaseous cushion includes sulfur trioxide gas.

6. A method as defined in claim 1 in which said gaseous cushion comprises a gas chosen from the group consisting of inert and oxidizing gases.

7. A method as defined in claim 6 in which said gaseous cushion includes a gas chosen from the group consisting of reducing gases hydrogen and carbon monoxide and inert gases nitrogen, argon and helium.

8. A method as defined in claim 1 in which said gaseous cushion is a layer of air at a temperature lower than the temperature of the glass in said ribbon.

9. A method as defined in claim 1 in which said ribbon is also supported on a second gaseous cushion during movement along said second path.

10. In apparatus for producing flat glass including a tank for containing a bath of molten metal upon which a layer of molten glass is free to flow laterally and develop into a buoyant body of molten glass of stable thickness, an annealing lehr beyond said tank, and means for exerting a tractive force on said ribbon to move the same over said molten metal bath and subsequently into and through said annealing lehr; the improvement comprising a pervious plate interposed between said tank and said lehr mounted at an elevation above the surface of said molten metal and defining a path of movement lifting said ribbon upwardly from said bath and directing it into said lehr, and means for forcing gas under pressure through said plate to form a gaseous cushion between said plate and a ribbon of glass moving thereover whereby said ribbon is lifted from said bath and directed into said lehr without direct contact with mechanical conveying means.

11. Apparatus as defined in claim 10 in which said plate is arcuately shaped in the plane of said path.

12. Apparatus as defined in claim 10 in which means is provided for sealing off the atmosphere surrounding said plate from the atmosphere over said molten metal bath and the atmosphere in the annealing lehr.

13. Apparatus as defined in claim 12 in which means is provided for exhausting gas escaping from the atmosphere above said bath of molten metal into the atmosphere surrounding said plate.

14. Apparatus as defined in claim 10 in which a second pervious plate is provided beyond said first mentioned plate, and means is provided for forcing gas under pressure through said second pervious plate to provide a gaseous cushion beneath said ribbon for supporting the same beyond said first mentioned cushion.

References Cited

UNITED STATES PATENTS

| | | | |
|---|---|---|---|
| 3,083,505 | 4/1963 | Wynne | 65—65 |
| 3,241,938 | 3/1966 | Michalik | 65—99 |
| 3,250,604 | 5/1966 | Toytot et al. | 65—32 |
| 3,348,934 | 10/1967 | Hinson et al. | 65—30 |
| 3,351,451 | 11/1967 | Barradell-Smith et al. | 65—157 |
| 3,356,474 | 12/1967 | Loukes et al. | 65—65 X |

ARTHUR D. KELLOGG, Primary Examiner

U.S. Cl. X.R.

65—32, 65, 99, 182